United States Patent
Meyer et al.

(10) Patent No.: US 9,210,127 B2
(45) Date of Patent: Dec. 8, 2015

(54) SYSTEM AND METHOD FOR LIMITING DATA LEAKAGE

(75) Inventors: Paul Meyer, White Bear Lake, MN (US); David Diehl, Minneapolis, MN (US); Spencer Minear, Fridley, MN (US)

(73) Assignee: McAfee, Inc.

( * ) Notice: Subject to any disclaimer, the term of this patent is extended or adjusted under 35 U.S.C. 154(b) by 291 days.

(21) Appl. No.: 13/161,493

(22) Filed: Jun. 15, 2011

(65) Prior Publication Data

US 2012/0324526 A1    Dec. 20, 2012

(51) Int. Cl.
*G06F 7/04* (2006.01)
*H04L 29/06* (2006.01)

(52) U.S. Cl.
CPC .................... *H04L 63/0227* (2013.01)

(58) Field of Classification Search
USPC ........................................ 726/28–30
See application file for complete search history.

(56) References Cited

U.S. PATENT DOCUMENTS

| | | | | |
|---|---|---|---|---|
| 8,533,834 B1 * | 9/2013 | Wong et al. | | 726/24 |
| 2002/0199098 A1 * | 12/2002 | Davis | | 713/160 |
| 2008/0016546 A1 * | 1/2008 | Li et al. | | 726/1 |
| 2009/0282471 A1 * | 11/2009 | Green et al. | | 726/12 |
| 2009/0320105 A1 * | 12/2009 | Jurkiewicz et al. | | 726/5 |
| 2010/0125898 A1 * | 5/2010 | Dubuc et al. | | 726/7 |
| 2010/0185586 A1 * | 7/2010 | Patiejunas | | 707/640 |
| 2010/0325588 A1 * | 12/2010 | Reddy et al. | | 715/853 |
| 2012/0079607 A1 * | 3/2012 | Lal et al. | | 726/29 |

OTHER PUBLICATIONS

Zhang et al., "Research and Application of the Transparent Data Encpryption in Intranet Data Leakage Prevention," Computational Intelligence and Security, 2009. CIS '09. International Conference on 2009 , pp. 376-379.*

Qingyu et al. "Research on the Embedded Security Architecture Based on the Control Flow Security," Computer Science and Engineering, 2009. WCSE '09. Second International Workshop on 2009 , pp. 133-137.*

* cited by examiner

*Primary Examiner* — Roderick Tolentino
(74) *Attorney, Agent, or Firm* — Blank Rome LLP.

(57) ABSTRACT

System and methods for connection processing with limited data leakage. The system records state associated with a connection request in a connection state engine, records state associated with a connection acknowledgement in the connection state engine, stores data sent after the connection acknowledgement in a buffer and determines, without a proxy, whether to allow or deny a connection as a function of the data stored in the buffer.

11 Claims, 3 Drawing Sheets

SYSTEM AND METHOD FOR LIMITING DATA LEAKAGE

BACKGROUND

Firewalls are traditionally only as strong or as weak as the policies you define. But effective security policies for today's complex Internet traffic depend on fine-grained understanding that can be hard to come by. What is needed is insight that goes far beyond port and protocol to encompass different web applications and users and the sophisticated threats that target them.

BRIEF DESCRIPTION OF THE DRAWINGS

In the drawings, which are not necessarily drawn to scale, like numerals may describe similar components in different views. Like numerals having different letter suffixes represent different instances of similar components. The drawings illustrate generally, by way of example, but not by way of limitation, various embodiments discussed in the present document.

DETAILED DESCRIPTION

Where in the past one could await signatures, the breakneck pace of threat evolution today demands proactive, predictive diagnosis of risk. Multiple attributes, such as content and behavior, should be assessed to reveal malicious intent before a new threat is confirmed.

Today's advanced firewall systems allow the client and server to establish a connection if allowed by the security policy, but will terminate the connection if subsequent content reveals activity that is not permitted. The problem with such an approach is that a certain number of bytes of the data sent cross the firewall and sent to their destination before the connection can be terminated. This data leakage is not desirable.

Figure 1:
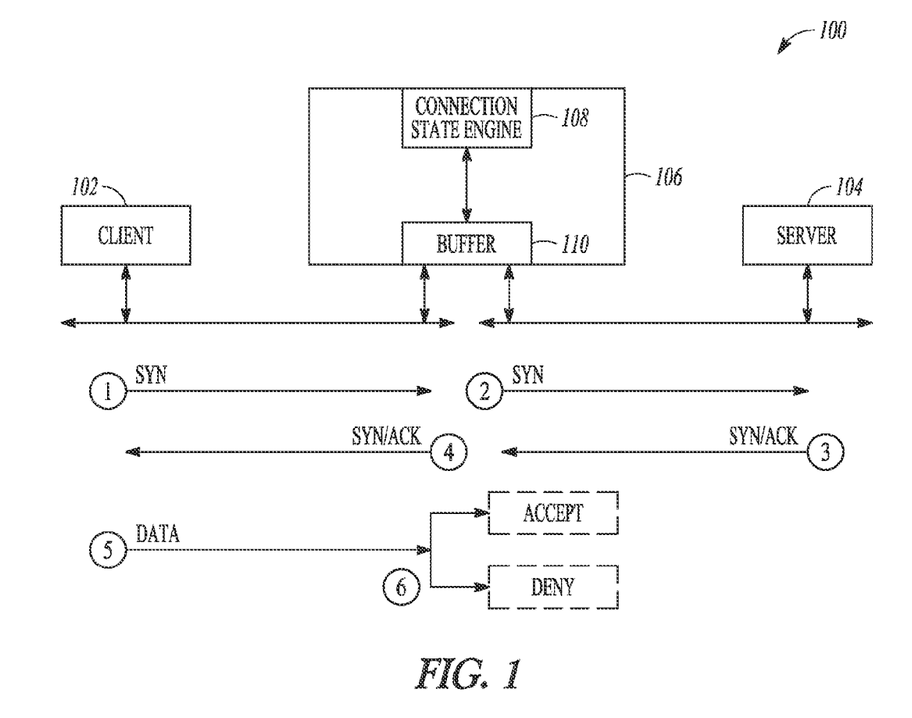
FIG. 1 illustrates one embodiment of a system for limiting data leakage.

A system that reviews content without data leakage is shown in FIG. 1. In the system 100 of FIG. 1, a client 102 attempts to make a connection through firewall 106 with server 104. Firewall 106 includes a connection state machine 108 and a buffer 110.

System 100 of FIG. 1 has the ability to inspect the initial portion of the data stream. It accomplishes this by allowing, in certain instances, the end-to-end connection between the client and the server (or between peers) to be established before policy can be fully determined.

At 1, client 102 sends a SYN. Firewall 106 receives the connection request and performs a first policy check. For example, connection state engine 108 may check to see if that particular client is allowed access to that server 104, or if it is allowed to make a connection with a particular port of server 104. If not, the connection is denied. If, however, the connection is permitted by the first policy check, connection state engine records initial state and option parameters associated with the connection request and a SYN is sent from firewall 106 to server 104 at 2. If server 104 responds with a SYN/ACK at 3, the SYN/ACK is forwarded to client 102 at 4. Once again, connection state engine 108 records the current state of the connection.

At 5, client 102 begins to transmit data and the data is stored in buffer 110. In one embodiment, buffer 110 is selected to handle up to the window size of the packet. For instance, buffer 110 may be sized to handle packets of up to 1500 bytes. Connection state engine 108 receives the data in buffer 110 and applies a pre-agent check at 6 to determine if the transaction is permitted by the security policy. If not, the connection is denied and the buffer flushed without any data leakage.

In one embodiment, if the transaction is permitted by the pre-agent check at 6, the data is sent through the IP filter and no further checks are made. In another embodiment, if the transaction is permitted by the pre-agent check, the data is sent through intrusion prevention signature (IPS) checks at layer 3 before being passed to server 104. No further checks are made.

Representative rules and their processing are detailed by Diehl et al. in U.S. patent application Ser. No. 13/161,477, "Rule Compilation in a Firewall," filed herewith, the description of which is incorporated herein by reference.

In one embodiment, named sockets provide a layer of abstraction between firewall 106 and server 104. Named sockets create a port namespace separate from Internet ports. This separate namespace is used to register a listening service with firewall 106. Specifically, a service process creates a socket and binds a name in the alternate namespace to it before listening. The name may be a string-valued (human readable) name, a numeric value in a separate number space, or other such value. In one embodiment, we use a four-character string for simplicity and for consistency with other internal components. The name for each service is known to the rule engine, and authorized requests are redirected to the alternate namespace using the appropriate name for the service. For example, a service process could create a socket named "http", and the rules could redirect authorized traffic sent to ports 80, 443, and 8080 to "http" for service. In one embodiment, if there are multiple sockets with the same name, the system does load-balancing across the sockets, avoiding any sockets that are over-full.

The advantages of using named sockets are numerous. First, service processes only need to register one name, independent of the number of ports on which the service is provided, and listen on only one socket. This can be a significant advantage (including performance) if the number of ports is large.

Second, incoming connection requests cannot accidentally match the listening socket for the service, as they are addressed to a numeric port, and the service is listening on a string-valued name in a separate namespace. Therefore, connection requests must be explicitly redirected to the alternate namespace in order connect to a service. External components cannot directly address the service sockets.

Such an approach provides increased architectural assurance that a connection has not reached a service without authorization: In previous implementations, a port number is both part of a service identity and one of the factors used in making a policy decision about a connection. By separating the service identity from the port number, the firewall policy becomes the sole mechanism by which a connection can be associated with a service.

Third, named sockets leads to increased efficiency in the service policy processing. For any connection which matches a policy rule based solely on factors available to the kernel (OSI layer 3 and 4 addresses), a service can trust that the service is fully authorized upon receipt of the connection at the named socket, removing any need for further policy processing.

Fourth, named sockets provide increased flexibility. Since the policy is the sole mechanism by which a connection can be associated with a service, named sockets allow the same destination port to be associated with different services within the same rule set.

Fifth, named sockets reduce complexity in the kernel policy. Resolving the semantic overlap created by using a port as both a service identity and a rule selector results in an internal policy representation which is frequently more complex than the user representation of the policy. By separating the service identity from the port, the kernel policy can directly reflect the user policy, increasing both assurance and performance.

Named sockets are described in greater detail by Green et al. in U.S. patent application Ser. No. 12/116,347, filed May 7, 2008, the description of which is incorporated herein by reference.

In one embodiment of the firewall of system 100, connection requests to named sockets that have not previously been set up are denied at the pre-agent check by connection state engine 108. For instance, a HTTP request will be denied unless a HTTP named socket has been created and bound to the appropriate name in the named socket namespace.

Although FIG. 1 illustrates the initial data transfer coming from client 102, in one embodiment, buffer 110 can buffer data from either client 102 or server 104 before determining whether to allow or deny the transfer. Thus, a decision can be made based on data sent immediately after the connection acknowledgement without data leakage.

Figure 2:
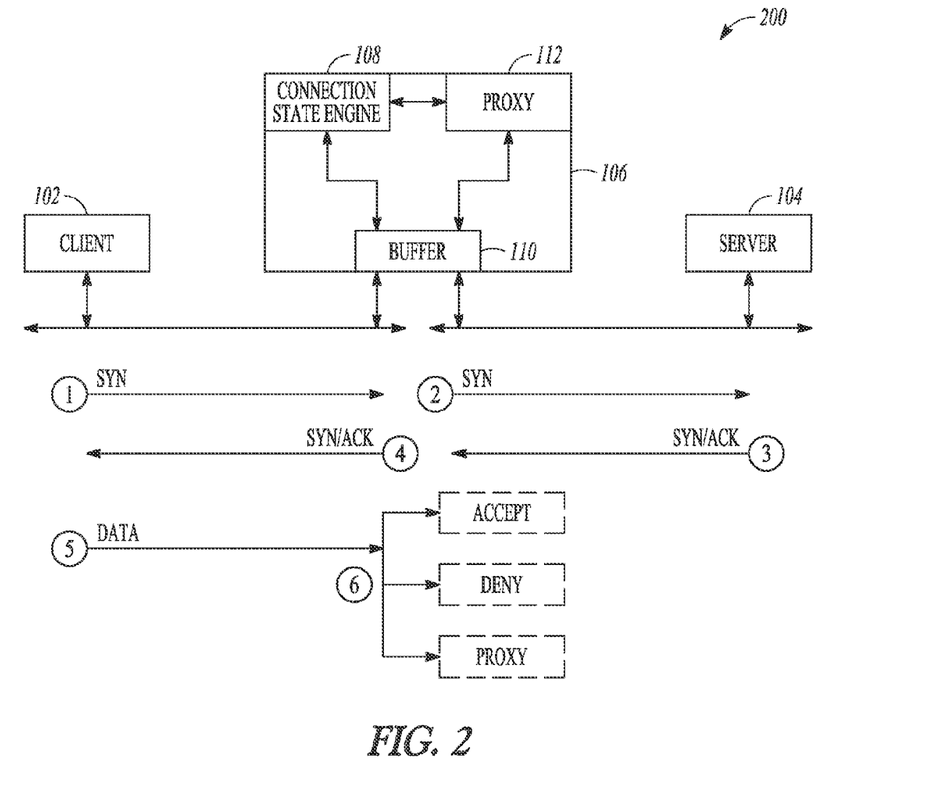
FIG. 2 illustrates another embodiment of a system for limiting data leakage.

Another embodiment of a system that limits data leakage when establishing a connection is shown in FIG. 2. In system 200 of FIG. 2, a client 102 attempts to make a connection through firewall 106 with server 104. Firewall 106 includes a connection state machine 108, a buffer 110 and one or more proxies 112.

System 200 of FIG. 2 also has the ability to inspect the initial portion of the data stream. It accomplishes this by allowing, in certain instances, the end-to-end connection between the client and the server (or between peers) to be established before policy can be fully determined. If connection state engine 108 determines that additional review is needed, the connection is handed off to proxy 112 in the manner detailed below. This handoff is termed "proxy promotion".

In one embodiment, proxy promotion takes an established TCP connection and converts it into a pair of socket connections at firewall 106. This pair of connections is then given to proxy 112, which then treats these connections as if it had been responsible for actually causing the full connection. This converts a direct connection through the firewall to a proxy-based connection. In one embodiment, these sockets will be linked for IPS purposes, but will not be socketmated. By not implicitly mating, proxy 112 can inspect the data stream for further actions as required by policy, and can socketmate later, if needed.

An example connection is shown in FIG. 2. At 1, client 102 sends a SYN. Firewall 106 receives the connection request and performs a first policy check. For example, connection state engine 108 may check to see if that particular client is allowed access to that server 104, or if it is allowed to make a connection with a particular port of server 104. If not, the connection is denied. If, however, the connection is permitted by the first policy check, connection state engine records initial state and option parameters associated with the connection request and a SYN is sent from firewall 106 to server 104 at 2.

In one embodiment, connection state engine 108 saves certain bits of information from the initial SYN, SYN/ACK, and ACK packets during a given connection's three-way TCP handshake. This data is needed to properly build the TCP and socket control blocks once the connection is fully established.

In one such embodiment, the half-session structures are modified to contain a pointer to a new structure for this data. In one embodiment, the new structure is modeled after the FreeBSD syncache structure (that structure currently holds some values in the half-session).

In one approach, this new structure is managed out of a new allocation zone, with size parameters taken from the TCP SYN cache. Once a given connection has been determined to remain with connection state engine 108 processing, or the connection has been promoted to a proxy 112, this structure is freed.

As discussed with regard to FIG. 1 above, in system 200 of FIG. 2, if server 104 responds with a SYN/ACK at 3, the SYN/ACK is forwarded to client 102 at 4. Once again, connection state engine 108 records the current state of the connection.

At 5, client 102 begins to transmit data and the data is stored in buffer 110. In one embodiment, buffer 110 is selected to handle up to the window size of the packet. For instance, buffer 110 may be sized to handle packets of up to 1500 bytes. Connection state engine 108 receives the data in buffer 110 and applies a pre-agent check at 6 to determine if the transaction is permitted by the security policy. If not, the connection is denied and the buffer flushed without any data leakage.

If the transaction is permitted by the security policy, a determination is made at pre-agent check 6 whether the transaction should be passed off to a proxy. If so, control is passed to proxy 112. If not, firewall 106 continues with IP filter processing.

In one embodiment, if the transaction is permitted by the pre-agent check at 6 and the transaction is not passed to a proxy 112, the data is sent through the IP filter and no further checks are made. In another embodiment, if the transaction is permitted by the pre-agent check and the transaction is not passed to a proxy 112, the data is sent through intrusion prevention signature (IPS) checks at layer 3 before being passed to server 104. No further checks are made.

In one embodiment, the firewall 106 processes each transaction at 6 to determine whether a given data stream is http, ssl, or something else. This determination is then used to check for rules (and listen( ) sockets) for passing the data on to a proxy 112 rather than continuing with IP filter processing. In one such embodiment, proxies 112 include an HTTP proxy. In such an embodiment, buffer 110 buffers the data before forwarding and it is only read by the HTTP proxy if connection state engine 108 detects the message as an HTTP message.

In one embodiment, when a determination is made at 6 to pass the transaction off to a proxy, connection state engine 108 creates the following structures:

A set of an inbound socket, inpcb, and tcpcb representing the client to firewall portion of the connection;

A second socket, inpcb, and tcpcb set representing the firewall to server portion of the connection; and A new IP Filter socket session associated with this firewall to server socket set; and In addition, in one embodiment, the first filter session is marked as a socket session.

In one embodiment, these control blocks use the information saved while the connection is established for their important values. The sockets will be created with the IPS link association already set between them, but will not be socket-mated. The received data that drove the application identification will be placed in the appropriate inbound socket buffer allowing for either side to send data first.

In one embodiment, the appropriate listen socket is chosen based upon the pre-agent detect processing at 6, and the listen indication is sent up to proxy 112. The socket for the initial side of the connection (a to b) will then be returned on the accept( ), and at that time the socket with pending data will schedule a receive indication. The proxy will obtain the handle for the second socket via the new get_linked_socket( ) syscall.

In one embodiment, for each occurrence of an application aware proxy, firewall 106 needs to open a new socket and post a listen( ) as described below. In one such embodiment, proxy promotion processing causes a listen complete indication.

At being notified of a connection transfer, in one embodiment, proxy 112 takes the socket and reads up the connection information. In one such embodiment, proxy 112 reads up the rest of the connection information on the linked socket. Using this, proxy 112 builds the full connection structures and reads the first hunk of data from the queued socket in buffer 110 before taking over as proxy. Again, as noted above, connection state engine 108 is capable of processing initial data received from either client 102 or server 104 as part of its proxy promotion analysis.

In one embodiment, connection state engine 108 applies a hierarchy of rules to determine whether to allow or deny a transaction. Such an approach allows connection state engine 108 to make many determinations as to whether to allow or deny a transaction based on some or all of the data in buffer 110, even though that data may not be all the data needed to make all such determinations. Such determinations based on partial data significantly reduce the data leakage through firewall 106.

In one embodiment, the kernel is used to provide a number of new pieces of information to the user space application (typically, proxy 112). These include:

The associated socket descriptor for proxy promotion.
The zone this socket is connected to.
The application tentatively identified by signature processing to this point in IP Filter. Note that this is currently the value from the last app cache since promotion and IP Filter appid scanning are mutually exclusive today.
The IP Filter rule ID
The agent ID from pre-agent scan 6
The netsessid value connection state engine 108 used to align shared auditing with verbose connections In one embodiment, named sockets provide a layer of abstraction between firewall 106 and server 104. As noted above, named sockets create a port namespace separate from Internet ports. This separate namespace is used to register a listening service with firewall 106. Specifically, a service process creates a socket and binds a name in the alternate namespace to it before listening. The name may be a string-valued (human readable) name, a numeric value in a separate number space, or other such value. In one embodiment, we use a four-character string for simplicity and for consistency with other internal components. The name for each service is known to the rule engine, and authorized requests are redirected to the alternate namespace using the appropriate name for the service. For example, a service process could create a socket named "http", and the rules could redirect authorized traffic sent to ports 80, 443, and 8080 to "http" for service. In one embodiment, if there are multiple sockets with the same name, the system does load-balancing across the sockets, avoiding any sockets that are over-full.

In one embodiment, connection state engine 108 opens a new listen socket for each proxy instance. The new sockaddr is used on the bind( ) syscall. TCP treats these new AF listen sockets as another instance of an AF_INET-like family.

In one embodiment, bind( )/listen(s) posted against UDP or raw sockets will not support the new AF. In such an embodiment, this feature is intended only for connection-oriented stream sockets (in other words, TCP only).

Proxy promotion as described above allows firewall 106 to perform more in-depth analysis of transactions, but only when required by the security policy. For instance, proxy 112 can perform data normalization, virus scanning, decryption or encryption of data, and data loss prevention (DLP) analysis.

In addition, system 200 can read up a first block of data as if it had established a proxy session, perform a policy check, and determine whether you can deny or allow the connection based on the policy check alone. If so, the connection is never transferred to the proxy. The result is simpler and faster rule processing since only those transactions that can't be handled at the connection state engine 108 have to be transferred to proxy 112.

The Environment

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various examples, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 3:
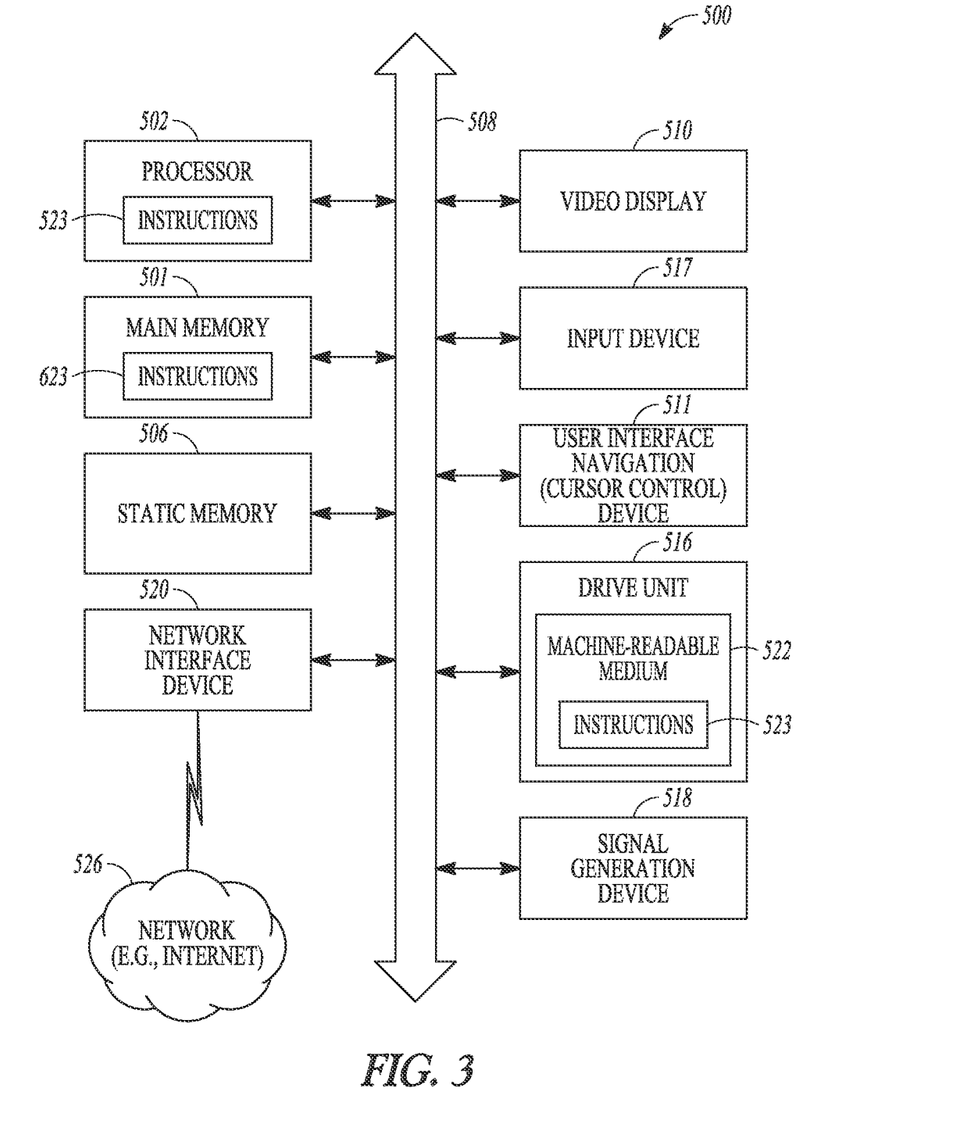
FIG. 3 illustrates a computer system according to one aspect of the present invention.

FIG. 3 is a block diagram illustrating an example machine upon which firewall 106 can be run. In a networked deployment, the machine can operate in the capacity of either a server or a client machine in server-client network environments, or it can act as a peer machine in peer-to-peer (or distributed) network environments. The machine can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes a processor 502 (e.g., a central processing unit (CPU), a graphics processing unit (GPU) or both), a main memory 501 and a static memory 506, which communicate with each other via a bus 508. The computer system 500 can further include a display unit 510, an alphanumeric input device 517 (e.g., a keyboard), and a user interface (UI) navigation device 511 (e.g., a mouse). In one embodiment, the display unit 510, input device 517 and UI navigation device 511 are a touch screen display. The computer system 500 can additionally include a storage device (e.g., drive unit) 516, a signal generation device 518 (e.g., a speaker or a light emitting diode (LED)), and a network interface device 520.

The storage device 516 includes a machine-readable medium 522 on which is stored one or more sets of data structures and instructions 523 (e.g., software) embodying or utilized by any one or more of the methodologies or functions described herein. The instructions 523 can also reside, completely or at least partially, within the main memory 501 and/or within the processor 502 during execution thereof by the computer system 500, with the main memory 501 and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 523. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 523 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a tangible computer-readable medium or tangible machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system for applying a security policy to connections between a first computer on a first network and a second computer on a second network, comprising:
 a buffer, wherein the buffer is sized to receive and buffer data associated with a connection request;
 a receiver coupled to the buffer; and
 a connection state engine connected to the buffer;
 wherein the connection state engine is configured to receive an indication of the connection request from the first computer for a connection to the second computer and record initial state information and option parameters associated with the connection request;
 wherein the connection state engine is configured to record current connection state information associated with the connection request after the connection state engine receives an indication that the second computer has sent an acknowledgement to the first computer;

wherein the receiver is configured to receive data into the buffer from one of the first or second computers after the acknowledgement, wherein the connection state engine is configured to read the received data from the buffer and is configured to deny use of the connection based on a pre-agent check that applies a security policy to the received data without forwarding the received data, responsive to receiving the indication that the second computer has sent an acknowledgement to the first computer, and wherein the security policy is expressed as a hierarchical set of rules, including rules based on reputation information assigned dynamically to a sender of the received data.

2. The system of claim 1, wherein the connection state engine is capable of identifying and controlling access to applications.

3. A system for applying a security policy to connections between a first computer on a first network and a second computer on a second network, comprising:

a buffer, wherein the buffer is sized to receive and buffer data associated with a connection request;

a receiver coupled to the buffer;

one or more proxies connected to the buffer; and a connection state engine connected to the buffer and the proxies;

wherein the connection state engine is configured to receive an indication of the connection request from the first computer for a connection to the second computer and record initial state information and option parameters associated with the connection request;

wherein the connection state engine is configured to receive an indication of a connection acknowledgement being sent from the second computer to the first computer and record state associated with the connection acknowledgement;

wherein the receiver is configured to receive data into the buffer from one of the first or second computers after the connection acknowledgement is received at the first computer; and wherein the connection state engine is configured to read the received data from the buffer, determine whether the connection should be promoted to one of the proxies based on a pre-agent check that applies a security policy to the received data, and promote the connection to a selected one of the proxies when it determines the connection should be promoted, wherein the selected proxy is configured to read current connection state information associated with the connection request and the connection acknowledgement and establish socket connections to the first and second computers as a function of the recorded state such that the connection changes into a proxy connection, responsive to the determination that the connection should be promoted, and wherein the security policy is expressed as a hierarchical set of rules, including rules based on reputation information assigned dynamically to a sender of the received data.

4. The system of claim 3, wherein the connections and rules are based on named sockets.

5. The system of claim 3, wherein the connection state engine is capable of identifying and controlling access to applications.

6. In a system for applying a security policy to connections between a first computer on a first network and a second computer on a second network, a method of determining whether to deny use of the connections, comprising:

receiving a connection request from the first computer;

recording initial state information and option parameters associated with the connection request;

receiving a connection request acknowledgement from the second computer;

recording current connection state information associated with the connection request acknowledgement;

storing in a buffer data received from one of the first or second computers after the connection request acknowledgement has been received at the first computer; and determining, as a function of the received data stored in the buffer, whether to deny use of the connection, responsive to receiving the connection request acknowledgement, based on a pre-agent check that applies the security policy to the received data, the security policy expressed as a hierarchical set of rules, including rules based on reputation information assigned dynamically to a sender of the received data, wherein, when use of the connection is denied, none of the received data is forwarded using the connection associated with the connection request between the first and second computer.

7. The method of claim 6, wherein determining includes determining to deny the connection if the connection request is for an HTTP message.

8. In a system for applying a security policy to connections between a first computer on a first network and a second computer on a second network, a method of determining whether to deny use of the connections, comprising:

receiving a connection request from the first computer;

recording initial state information and option parameters associated with the connection request;

receiving a connection request acknowledgement from the second computer;

recording current connection state information associated with the connection request acknowledgement;

storing in a buffer data associated with the connection request, wherein the data is received from one of the first or second computers after the connection request acknowledgement has been received at the first computer;

determining, as a function of the data stored in the buffer, whether to promote a message containing the data to a proxy, responsive to receiving the connection request acknowledgement, based on a pre-agent check that applies the security policy to the received data, wherein the security policy is expressed as a hierarchical set of rules, including rules based on reputation information assigned dynamically to a sender of the received data;

receiving, at the proxy, information corresponding to the message; and establishing socket connections to the first and second computers as a function of the recorded connection state information such that the connection changes into a proxy connection.

9. The method of claim 8, wherein determining includes determining to promote the connection if the connection request is for an HTTP message and there is a named socket for HTTP messages.

10. A non-transitory machine-readable medium, on which are stored instructions, comprising instructions that when executed cause a machine to:

receive a connection request from a first computer on a first network;

record initial state information and option parameters associated with the connection request;
receive a connection request acknowledgement from a second computer on a second network;
record current connection state information associated with the connection request acknowledgement;
store in a buffer data received from one of the first or second computers after the connection request acknowledgement has been received at the first computer; and
determine, as a function of the received data stored in the buffer, whether to deny use of the connection, responsive to receiving the connection request acknowledgement, based on a pre-agent check that applies the security policy to the received data,
wherein the security policy expressed as a hierarchical set of rules, including rules based on reputation information assigned dynamically to a sender of the received data, and
wherein, when use of the connection is denied, none of the received data is forwarded using the connection associated with the connection request between the first and second computer.

11. The machine-readable medium of claim 10, wherein the instructions that when executed cause the machine to determine whether to deny use of the connection comprise instructions that when executed cause the machine to determine to promote the connection if the connection request is for an HTTP message and there is a named socket for HTTP messages.

* * * * *